Patented Apr. 1, 1930

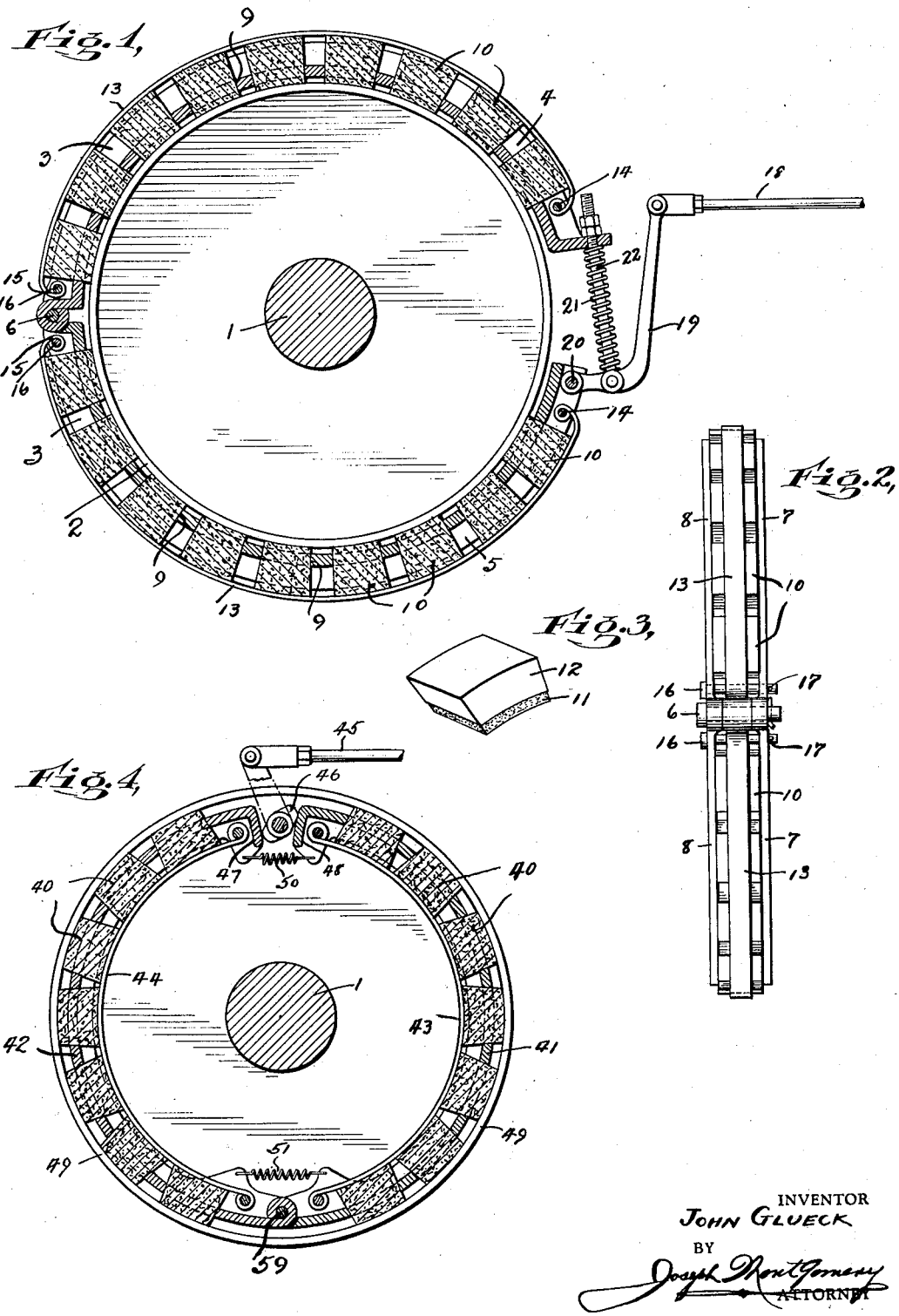

1,752,377

UNITED STATES PATENT OFFICE

JOHN GLUECK, OF WEST NEW YORK, NEW JERSEY, ASSIGNOR OF ONE-HALF TO RENE HUNKLE, OF GRANTWOOD, NEW JERSEY

BRAKE

Application filed February 5, 1927. Serial No. 166,166.

My invention relates to brakes for motor vehicles and the like and is particularly directed to improvements in the brake band or shoe and more particularly to the friction members carried by the band.

In brake bands as at present employed on motor vehicles a lining of friction material is riveted to the band. As this friction material wears down through use the rivets become exposed and come in contact with the brake drum thereby decreasing the frictional engagement or retarding effect and also producing injury to the brake drum. When it is desired to renew the lining of such bands, the band must first be removed from the drum and in fact from the vehicle itself, it then becomes necessary to destroy the rivets in order to remove the lining, after which a new lining is riveted in place and the band replaced on the drum. It is also necessary in brakes utilized at the present, to adjust the bands from time to time as the lining wears down. All of the inconvenience, annoyance and labor just mentioned is eliminated by my present invention.

One of the objects of the present invention is the provision of friction material in the form of sections or blocks which are removable from the brake band independently of each other any one section or block being removable for replacement or renewal without disturbing the others.

Another object of the present invention is the provision of a brake band wherein no rivets are employed or required to secure the friction material in place thereby eliminating the possibility of injury to the drum and the usual labor in replacing the lining.

A further object resides in the provision of friction material in the form of blocks which are non-expansible, non-inflammable and oil proof.

Still further objects will be manifest from the following description and the accompanying drawings in which Fig. 1 is a sectional elevation of an external brake employing my improved band.

Fig. 2 is an end view of the brake shown in Fig. 1.

Fig. 3 is a perspective view of one of the blocks of friction material employed in my improved brake band and Fig. 4 is a sectional elevation of my improved band applied to an internal form of brake.

Referring to the drawings in detail wherein I have illustrated one embodiment of my invention and first to Figs. 1 and 2 wherein I have illustrated my improved band applied to an external brake, 1 designates the axle of a motor vehicle on which is securely mounted the usual brake drum 2. Encircling this drum I provide a brake band 3 comprising two shoes 4 and 5 pivoted at 6.

These shoes in the form illustrated comprise semi-circular channel members provided with flanges 7 and 8 and a plurality of openings 9 in the bottom or web of the channel. The flanges and the openings together forming receptacles or compartments for the reception of blocks 10. The flanges 7 and 8 serve as walls or supports for said blocks to prevent side motion while the edges of the openings or cut out portions 9 serve as guides for the blocks. It is obvious that the blocks 10 will be maintained in upright position in the shoes 4 and 5 by means of this arrangement.

The blocks 10 are constructed of woven asbestos-wire fabric or any other material 11, having a high co-efficient of friction pressed into the desired form. In the preferred embodiment of my invention, I have illustrated these blocks as square in cross section and tapering toward their frictional or engaging end. The blocks 10 are provided with a coating or covering of lead or other suitable material 12, having oil proof and heat resisting characteristics. Such coating also serves as a protection for the blocks when stored in reserve. It is to be understood that these blocks may be in any desired form other than that illustrated and described.

Surrounding and in engagement with the exterior surfaces of the blocks in each shoe I provide a retaining band 13 one end of which is pivotally mounted at 14 and provided at its other end with a loop 15. Each shoe is provided with an orifice at its end adjacent the looped end of the band 13 for receiving a bolt 16 which passes through the loop 15 to thereby removably secure the same in place about the blocks. The bolt 16 may be retained in place in any suitable manner such as by the cotter pin 17 which will permit ready removal of the looped end of the retaining band.

It will be noted that the friction blocks are spaced apart. This arrangement will provide an air space which will serve to reduce the heat caused by the friction of the blocks on the drum.

It will be obvious from the foregoing description that should it be desired to replace one or more of the blocks 10, all that is necessary is to release the looped end of the retaining band, raise the band by pivoting the same at 14, lift out the worn block or blocks and replace new blocks in the vacated compartments, the retaining band is then again secured in place. All of which can readily be done without removing the brake band from the drum.

The brake band shown in Figs. 1 and 2 is contracted and expanded in the same manner as external bands at present in use. To apply the brake the lever 18 is moved to the right by movement of the brake lever or pedal (not shown) thereby rocking the bell crank lever 19 about the pivot 20 bringing the friction blocks 10 carried by the shoes 4 and 5 into frictional engagement with the brake drum 2 to cause the necessary retarding effect. The rocking of the bell crank lever 19 just described places the spring 21 surrounding the connecting rod 22 under compression. When pressure on the brake pedal or lever is released the compression spring 21 expands thereby separating the shoes and disengaging the friction blocks from the drum. The brake here shown is applied, that is, it is in braking position. In Fig. 4 I have illustrated an internal brake employing my improved band. In this construction the blocks 40 are of the same construction as the blocks 10 except that they are convex on the engaging face and concave on the exterior face. The shoes 41 and 42 are also shown comprised of channel members pivoted at 59 and provided with compartments. These shoes, however, are curved in the opposite direction from the shoes 4 and 5 so as to adapt them to this particular form of brake. These shoes are furnished with retaining bands 43 and 44 respectively the operation of which is similar to that of the retaining bands Figs. 1 and 2.

The retarding of braking effect is accomplished in this form through the movement of the rod 45 to the right which rocks the cam 46 to engage the shoulders 47 and 48 on the shoes 41 and 42 respectively to cause the same to separate thereby forcing the blocks 40 into frictional engagement with the interior of the drum 49. Upon releasing the pressure on the brake lever the rod 45 moves to the left and the shoes are contracted by means of the compression springs 50 and 51 to withdraw the blocks 40 out of engagement with the drum.

It is to be understood that while I have illustrated and described a preferred embodiment of my invention I do not wish to be limited to this precise construction as it is obvious that many changes and modifications may be made without departing from the spirit and scope of my invention.

What I claim is:

1. A brake band, friction blocks, compartments in said band for each of said blocks and a single band for retaining said blocks in said compartments.

2. A brake band, friction blocks carried thereby and independently removable therefrom, and a retaining band for said blocks.

3. In combination, a sectional brake band, a plurality of friction blocks in each section, and a retaining band for said blocks in each section.

4. In combination, a sectional brake band, friction blocks, compartments in each section for said blocks, retaining bands for said blocks, said blocks being independently removable upon releasing said bands.

5. A brake band adapted to encircle a brake drum, a plurality of tapered friction blocks, a plurality of compartments in said band for receiving said blocks, the small end of said blocks passing through the bottom of said compartments so as to frictionally engage said drum.

This specification signed this 2nd day of February 1927.

JOHN GLUECK.